Sept. 20, 1955 G. A. JUST 2,718,632

ANNUNCIATOR SYSTEM

Filed July 30, 1951

INVENTOR.
GEORGE A. JUST
BY
Albert Sperry
ATTORNEY

United States Patent Office 2,718,632
Patented Sept. 20, 1955

2,718,632

ANNUNCIATOR SYSTEM

George A. Just, Scarsdale, N. Y., assignor to The Grand Union Company, New York, N. Y., a corporation of Delaware Application July 30, 1951, Serial No. 239,322
7 Claims. (Cl. 340—312)

Figures 1, 2:
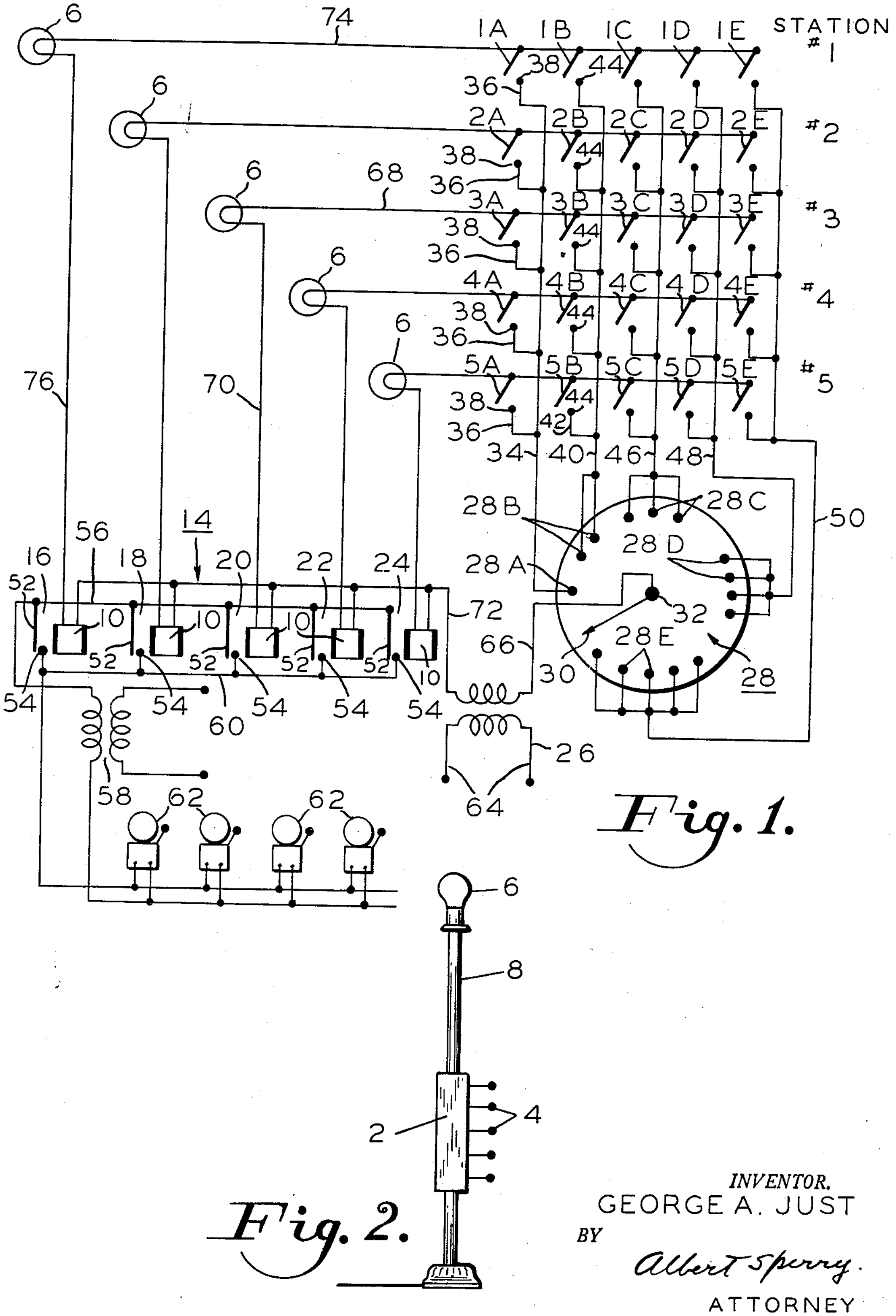

This invention relates to annunciator systems and is directed particularly to systems wherein a plurality of signals may be set up at one or more stations at the same time and be repeated in succession over the annunciator system, with visible indications showing where each signal originates.

It has been common practice heretofore to provide systems in which a single signal may be transmitted by a bell, "Klaxon" or light to various departments or locations for calling an individual such as a manager or superintendent to the telephone. In such systems the party making the call communicates directly with a central switchboard and the operator at the switchboard then actuates the signaling system to send out a call to the various departments where the party being called may be located. Such systems are not generally suitable for use in large grocery stores, warehouses, garages and elsewhere where no central switchboard is used. Furthermore, it has not been possible to send out a series of signals to call different managers or individuals simultaneously and the signals could not be set up directly from each of a plurality of stations at the same time. In other words when the circuit was being used for one call from one station it could not be used for any other calls from any other stations without completely disrupting or mixing all calls.

There are many situations in which more flexible annunciator systems are required. Thus, for example, in large self service stores where a number of check-out stations are provided, it is frequently necessary for one or more of the checkers to determine whether the price marked on a package or item being checked is correct. Under such circumstances one or more checkers may find it necessary to call various departments or the same department. At the same time it may also be necessary for one or more checkers to call the cashier or manager to make change for a large bill or to approve cashing a check without leaving the checking stations. It is therefore important that signals or calls be capable of being sent out simultaneously instead of requiring each checker to wait until a call sent out by another checker is completed. Furthermore, when answering a call each manager should be able to determine promptly which of several stations has placed a call for him.

In accordance with the present invention annunciator systems are provided which are capable of receiving, transmitting and repeating a plurality of signals simultaneously or in succession. The systems preferably also are designed so that signals may originate at any of several points or stations to send out calls for a plurality of persons at the same time and means are provided for indicating where each person called is wanted. This is preferably accomplished by providing an annunciator system with a rotatable signal repeating device capable of transmitting a number of different signals in succession in each cycle of operation. The system further may be constructed so as to permit such signals to originate at various sources at the same time and include means for indicating the origin of each signal.

One of the objects of the present invention is to provide a novel type of annunciator system in which several different signals may be transmitted one after the other in rapid succession from each of a number of stations or other points of origin.

Another object of the invention is to provide an annunciator system by which signals may be initiated from each of a number of sources and at the same time indicate the point of origin of each signal.

A further object of the present invention is to provide an annunciator system in which each of a plurality of signals may be initiated from each of a number of stations simultaneously and successively repeated without delay or interference by reason of other signals impressed on the system.

A specific object of the invention is to provide an anunnciator system adapted for use in self service stores wherein a plurality of checkers may at any time send out simultaneously signals to any one or a number of persons or departments for calling persons or the managers of various departments to their checking stations.

These and other objects and features of the present invention will appear from the following description thereof in which reference is made to the accompanying drawing.

In the drawing:

Fig. 1 is a diagrammatic illustration of a wiring system adapted for use in the practice of the present invention; and Fig. 2 is a diagrammatic illustration of a control unit for use at a station in sending out different signals.

In that form of the invention chosen for purposes of illustration in the drawing the checking stations are each provided with a panel or control box such as that indicated at 2 in Fig. 2 on which are located a number of signaling handles or buttons 4. As shown each panel is provided with five circuit closing devices designed for use in calling the managers of each of different departments such as the meat department, vegetable department, grocery department, delivery department, and the cashier or store manager. For purposes of illustration the wiring diagram of Fig. 1 is shown as being provided with five different stations where signals may originate. These may be located at the checking stations, in the manager's office, or at any other desired points and are indicated in the drawings as stations #1 to #5. The buttons or levers 4 serve to operate the switches 1A, 1B, 1C, 1D, 1E and 1F; 2A, 2B, 2C, etc., there being a similar set of switches at each station controlled by the buttons 4 in a control box 2 at each of the stations #1 to #5 inclusive. All of the circuit closing devices at each station are connected together in parallel and included in a circuit with a signal light indicated at 6 which may be mounted on a standard 8 by which the control box 2 is supported at a checker's station.

The light 6 at each station is connected in series with an actuating device such as a solenoid 10 which serves to actuate one of the signal operating relays in the signaling circuit 14. One relay may be provided for each station in the system as indicated at 16, 18, 20, 22, and 24.

A signal transmitting device indicated generally at 28 is provided with a series of contacts indicated at 28A, 28B, 28C, 28D and 28E which as shown may be arranged in a circular form for engagement by a contact member 30 which is rotatable about a central axis 32 by suitable means such as a continuously operating motor (not shown). The contact 28A consists of a single contact element whereas contact 28B consists of a pair of contact elements. Contact 28C includes three contact elements, contact 28D includes four such elements, and contact 28E includes five contact elements. The elements of each contact are positioned relatively close together while the contacts themselves are spaced further apart than the elements included in the separate contacts. On rotation of the contact member 30 a circuit will be completed on each cycle of operation provided one or more of the switches 1A, 1B, 2A, 2B, etc. is closed. The signal transmitting device thus causes the different signals consisting of one, two, three, four or five sounds or impulses to be impressed on the signaling circuit in close succession to constitute a different signal but these particular signals will not be repeated in such close succession as to cause one signal to be confused with another.

The switches 1A, 2A, 3A, 4A, and 5A are each connected to contact 28A by a conductor 34. A branch conductor 36 extends from conductor 34 to the contact 38 of the switch 5A and a similar branch conductor extends from conductor 34 to the contact 38 of switch 4A. In like manner each of the switches 3A, 2A and 1A includes a contact 38 connected to the conductor 34. The contacts 28B of the transmitting device are connected by a conductor 40 to each of the branch lines 42 leading to the contacts 44 of each of the switches 5B, 4B, 3B, etc. The contacts 28C are connected to the switches 5C, 4C, 3C, etc. by the conductor 46, conductor 48 serves to connect the contacts 28D to the switches 5D, 4D, etc. and conductor 50 serves in a like manner to connect the contact 28 to the switches 5E, 4E, 3E, etc.

In this way five separate sending circuits are provided and the switches or circuit closing devices at the various stations are arranged in parallel so that each of the operators at each of the check-out stations #1 to #5 can actuate any or all of the buttons or control levers 4 at any time to close any or all of the sending circuits for transmitting different signals to call personnel assigned any one of the five coded call numbers or signals. Current for energizing the sending circuits is supplied from the transformer 26 whereas current for energizing the signaling circuit is supplied from the transformer 58.

The solenoids 10 when energized by the closing of one of the switches and the operation of transmitting device 28 serve to attract the armature 52 of the signal operating relay with which that switch is associated. The armature will be attracted once or a number of times for each particular signal depending upon the number of contact elements included in the contacts 28A, 28B, etc. of the transmitting device through which circuits are completed. Upon energizing any of the solenoids 10 to transmit a signal, the armature 52 of the relay associated with the solenoid will be moved to engage a contact 54. Current will then flow from one side of the low voltage winding of transformer 58 through the conductors 56, armature 52 and contact 54 to conductor 60 and thence to the signal means 62 and back to the opposite side of the transformer. The signaling means may be bells, klaxons, lights or other signals located in each of the various departments or areas to which it is desired to send a signal.

In using the annunciator system shown in the drawing and described above, it may be assumed for example, that the operator at station #3 wishes to call the manager of the meat department whose signal may consist of, say, two rings of a bell. In order to call the manager of the meat department, the operator at station #3 will then actuate the button or lever 4 which serves to close the switch 3B. When switch 3B is closed current will flow from the power line 64 and the transformer 26 to conductor 66 and the contact member 30 of the transmitting device 28. As the contact member rotates about its axis 32 it will engage each of the two contacts 28B in each cycle of operation. Current will then flow through the conductor 40 and contact 44 of closed switch 3B to the conductor 68 whereupon the lamp 6 will be lighted in two successive flashes corresponding to the completion of the circuit through each of the two contact elements of the contact 28B. From the lamp 6 current will flow through conductor 70 to the solenoid 10 associated with the relays 20 corresponding to station #3. From the solenoid 10 current will return through the conductor 72 to the opposite side of the transformer 26.

The solenoids 10 are energized by completion of the sending circuit as described whereupon the armature 52 is attracted to engage the contact 54 and complete the signaling circuit to actuate the bell or signal means 62. Since the contact 28B consists of two closely spaced contact elements the movement of the contact member 30 into engagement with the two elements will cause the bell to be rung two times in quick succession or to cause other signal means to be actuated in a characteristic manner. The manager of the meat department hearing these two notes on the bell will recognize it as his call and may immediately glance toward the check-out counters and see which of the checkers' lights is flashing twice to call his attention. The manager can then go directly to the checker calling him and give the necessary information to permit the checker to continue work without leaving her station.

In the event the operator of another station, for example station 1, should wish to call the manager of the meat department or perhaps some other manager or the cashier, she will actuate the button or control lever 4 to send out a signal for that person. For instance, the operator of station 1 may close the switch 1A, in which event a circuit will be completed through the contact 28A, conductor 34, branch conductor 36 and contact 38 of the switch 1A. Current will then flow through the conductor 74 and light 6 to conductor 76 whereupon the solenoid 52 in series with conductor 76 will be energized and the relay 16 will then be actuated upon engagement of the rotating contact member 30 with the contact 28A.

When both contact 1A and contact 3B are closed the signal transmitted by the device 28 will consist first of a signal bell or impulse of the signaling means 62 followed by a delay after which two successive strokes of the bell will result from contact of the moving contact member 30 with the elements of contact 28B. In this way the person whose signal is one stroke of the bell will be advised that he is needed at the checking station where the the light 6 is flashing once and immediately thereafter the manager of the meat department whose signal is two strokes of the bell will hear his signal and know that he is also needed at the check-out station where the light 6 is flashing twice. In the same manner any one or all of the stations #1 to #5 may signal any one or all of the managers or members of the personnel of the store who may be needed. Moreover, two or any number of stations may call the same manager and even after one station has returned its switch to the inactive position the calls from the other stations will continue until all calls have been answered.

The speed of rotation of the contact member 30 and the spacing of the various contacts on the transmitting device should be such as to allow a limited period of delay between different signals. However, any one or all of the signals 28A, 28B, 28C, 28D and 28E may be actuated one after the other in succession and these signals will be repeated again upon each cycle of rotation of the contact member 30 of the transmitting device. Moreover, the signals will continue to be repeated as long as any one of the switches connected to a particular signal is closed by any one of the operators at the various check-out stations.

It will be apparent that any signal may be transmitted from any number of stations to the signal transmitting device 28 and that the latter device may in turn send out any number or type of signals for calling the attention of different individuals at various locations throughout a store, plant, garage or warehouse. When used in a self service store or a department store the signal means 62 will generally be in the form of a bell having a pleasing tone, whereas when used in a garage, factory or warehouse, the signal means may be in the in the form of a loud klaxon or horn. If desired, a light may be used as the signaling means 62 by itself or in combination with any audible signal. Similarly the lights 6 at the various sending stations may be replaced by any suitable or preferred form of indicating means.

The duration of the signals sent out is under the control of the operators at the various stations and as soon as the person called has appeared or when they are no longer needed the switch at the operator's station may be opened to discontinue the signal from that station. At the same time, the same or other signals will continue to be sent out from other stations wishing to make a call as long as any of the circuit closing devices in the sending circuits remain closed.

From the foregoing description of a preferred embodiment of the invention it will be apparent that the system described above and illustrated in the drawing is capable of many applications and may be varied considerably in character and use. In view thereof, it should be understood that the particular form of the invention illustrated in the drawings and the particular application thereof described is intended to be illustrative only and is not intended to limit the scope of the invention.

What I claim is:

1. An annunciator system comprising a plurality of circuit closing devices located at each of a plurality of sending stations, a periodically operating signal transmitting device including a common contact member engageable with a plurality of contacts, said contacts each including a different number of contact elements to which said circuit closing devices are connected, actuating means included in a circuit controlled by said signal transmitting device and energized by completion of said circuit through any one or more of said circuit closing devices, a signaling circuit including signaling means, and a circuit closing device in said signaling circuit operable in response to energizing of said actuating means to cause said signaling means to be operated periodically provided any circuit closing device at any one of said sending stations has been closed.

2. An annunciator system comprising a plurality of circuit closing devices located at each of a plurality of sending stations, a periodically operating signal transmitting device including a common contact member engageable with a plurality of contacts, said contacts each including a different number of contact elements to which said circuit closing devices are connected, actuating means included in a circuit controlled by said signal transmitting device and energized by completion of said circuit through any one or more of said circuit closing devices, indicating means at each of said stations and included in said circuit for operation to indicate the station where a circuit closing device has been closed, a signaling circuit including signaling means, and a circuit closing device in said signaling circuit operable in response to energizing said actuating means to cause said signaling means to be operated periodically provided any circuit closing device at any one of said sending stations has been closed.

3. An annunciator system comprising a plurality of sets of circuit closing devices one of which sets is located at each of a plurality of sending stations, a plurality of parallel sending circuits each including one circuit closing device at each station, a signal transmitting device having a series of contacts thereon with each contact of said series including a different number of contact elements, a movable contact member engageable with each contact of said series, means for moving said contact member successively from one contact member to another in said series to complete each sending circuit successively provided a circuit closing device therein is closed, actuating means included in said sending circuits and controlled by said movable contact member, a signaling circuit including signaling means, and a circuit closing device in said signaling circuit movable in response to operation of said actuating means to close the signaling circuit and operate said signaling means periodically a different number of times upon completion of different sending circuits.

4. An annunciator system as defined in claim 3 wherein indicating means are located at each sending station and included in said sending circuits to indicate which station has initiated a signal.

5. An annunciator system as defined in claim 3 wherein each circuit closing device at a given station is connected to a different sending circuit and is arranged in parallel relation to the circuit closing devices connected to said circuit at any other station whereby the closing of a circuit closing device at any station will serve to cause said signaling means to be operated in a predetermined manner and independently of any condition established at any other station.

6. An annunciator system comprising a plurality of sets of circuit closing devices one of which sets is located at each of a plurality of sending stations, indicating means at each sending station actuated by completion of a circuit through any circuit closing device of the set at said station, signaling means included in a signaling circuit, and means responsive to closure of one or more circuit closing devices at the same or different stations for actuating said signaling means to transmit a desired signal and simultaneously actuate said indicating means to indicate at which station or stations the signal originated.

7. An annunciator system comprising a plurality of sets of circuit closing devices one of which sets is located at each of a plurality of sending stations, indicating means at each sending station, a different sending circuit including each of the circuit closing devices at a station, a common connection from each circuit closing device to said indicating means for actuating said indicating means upon the completion of any sending circuit, signaling means included in a signaling circuit, and means responsive to closure of one or more circuit closing devices at the same or different stations for actuating said signaling means to transmit a desired signal and simultaneously actuate said indicating means to indicate at which station or stations the signal originated.

References Cited in the file of this patent

UNITED STATES PATENTS

| | | |
|---|---|---|
| 1,749,444 | Rae | Mar. 4, 1930 |
| 1,780,711 | Lichter | Nov. 4, 1930 |
| 1,795,536 | Baker | Mar. 10, 1931 |
| 2,134,562 | Kimmich | Oct. 25, 1938 |